Aug. 10, 1954  R. T. LEACH  2,685,965
SEED GRADING AND TREATING MACHINE
Filed Feb. 14, 1951  6 Sheets-Sheet 1
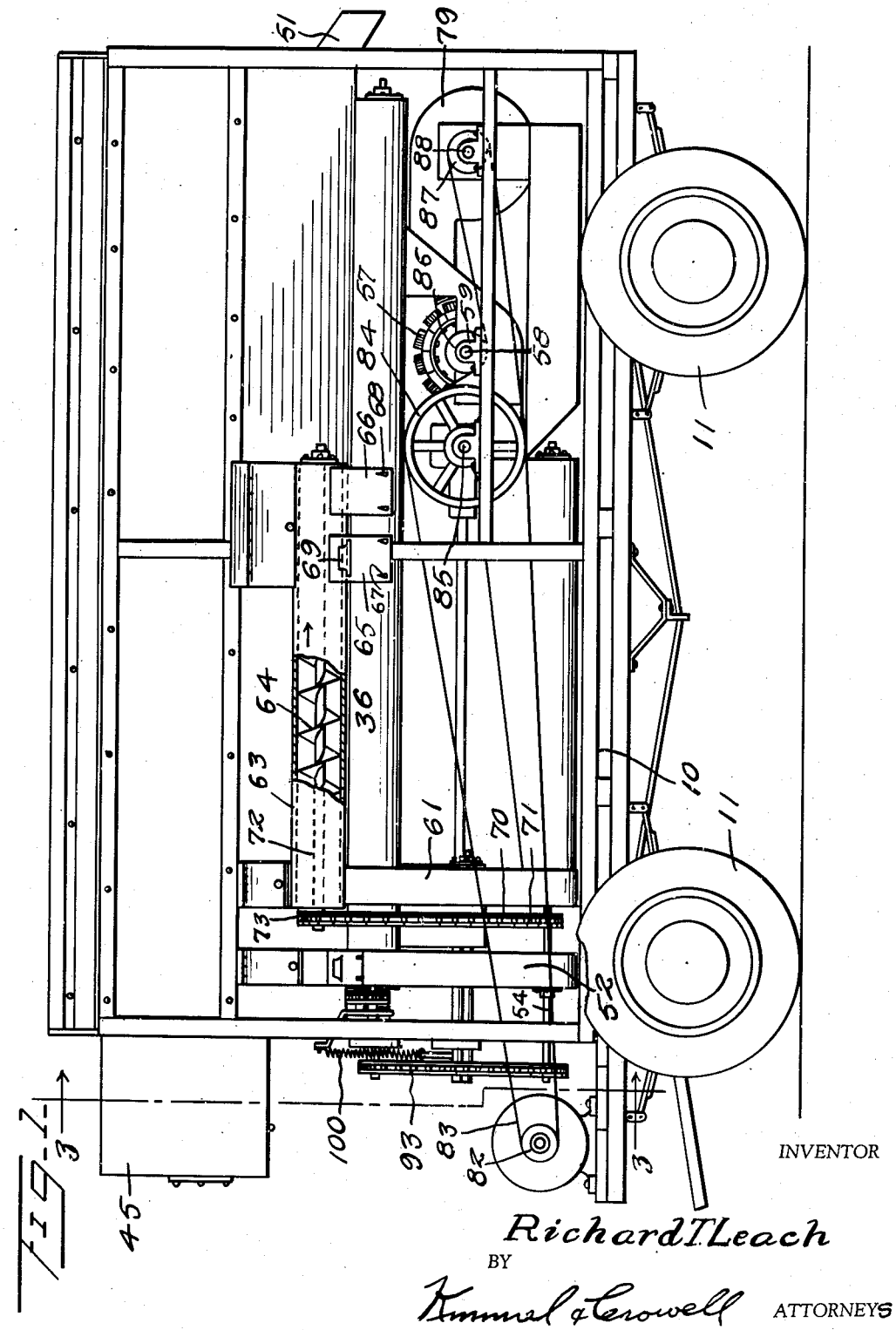
INVENTOR
Richard T. Leach
BY
Kimmel & Crowell  ATTORNEYS

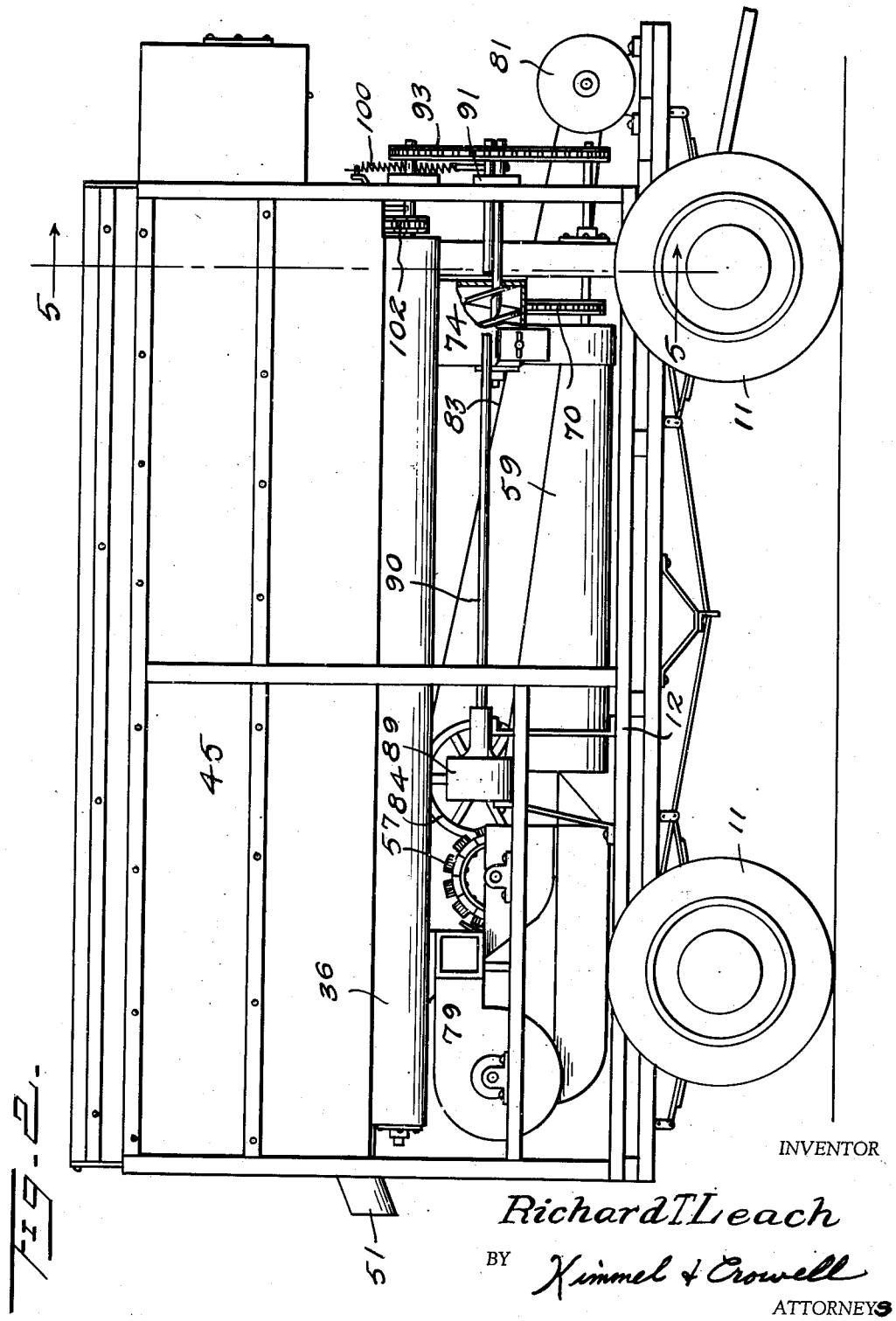

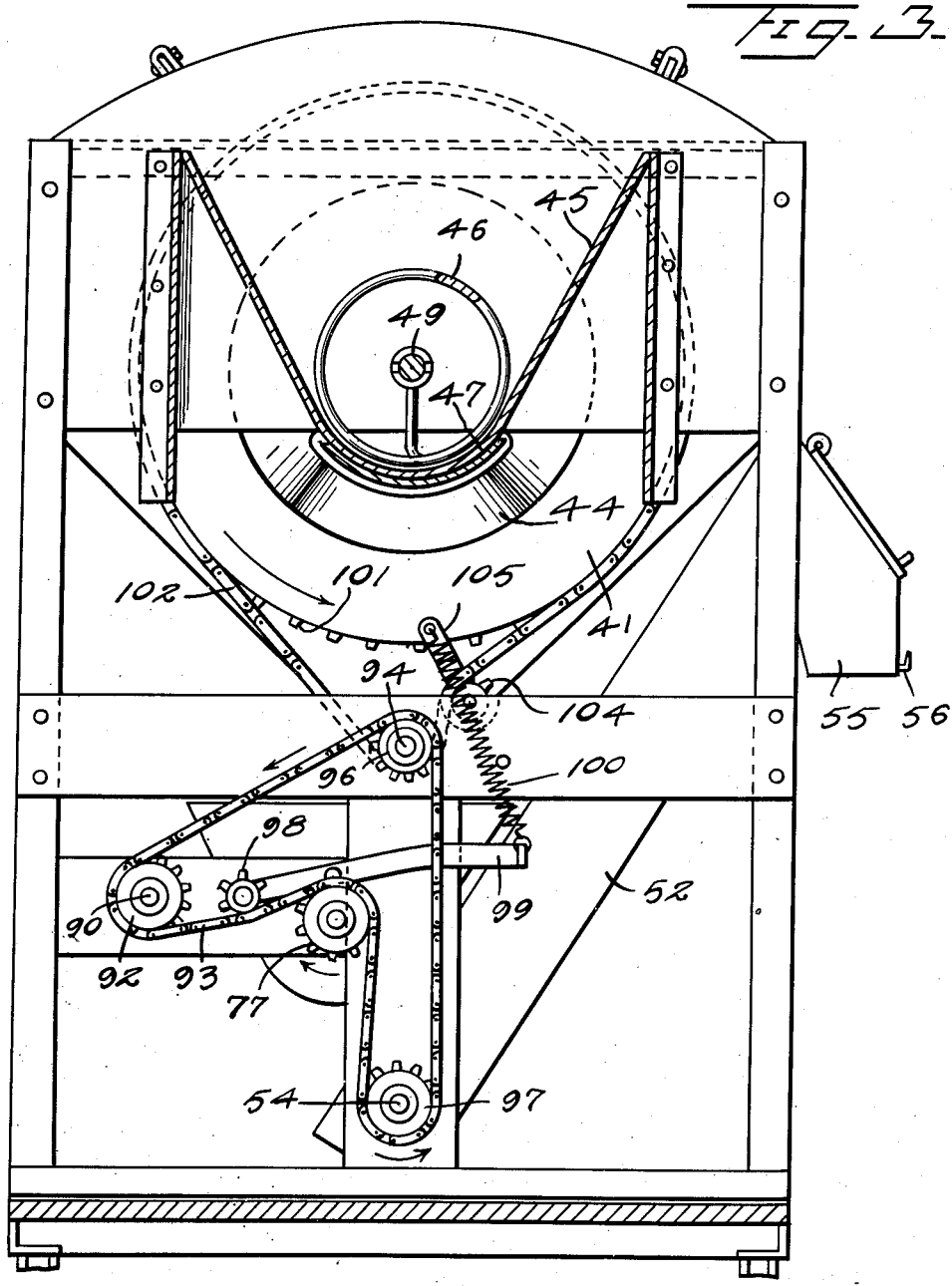

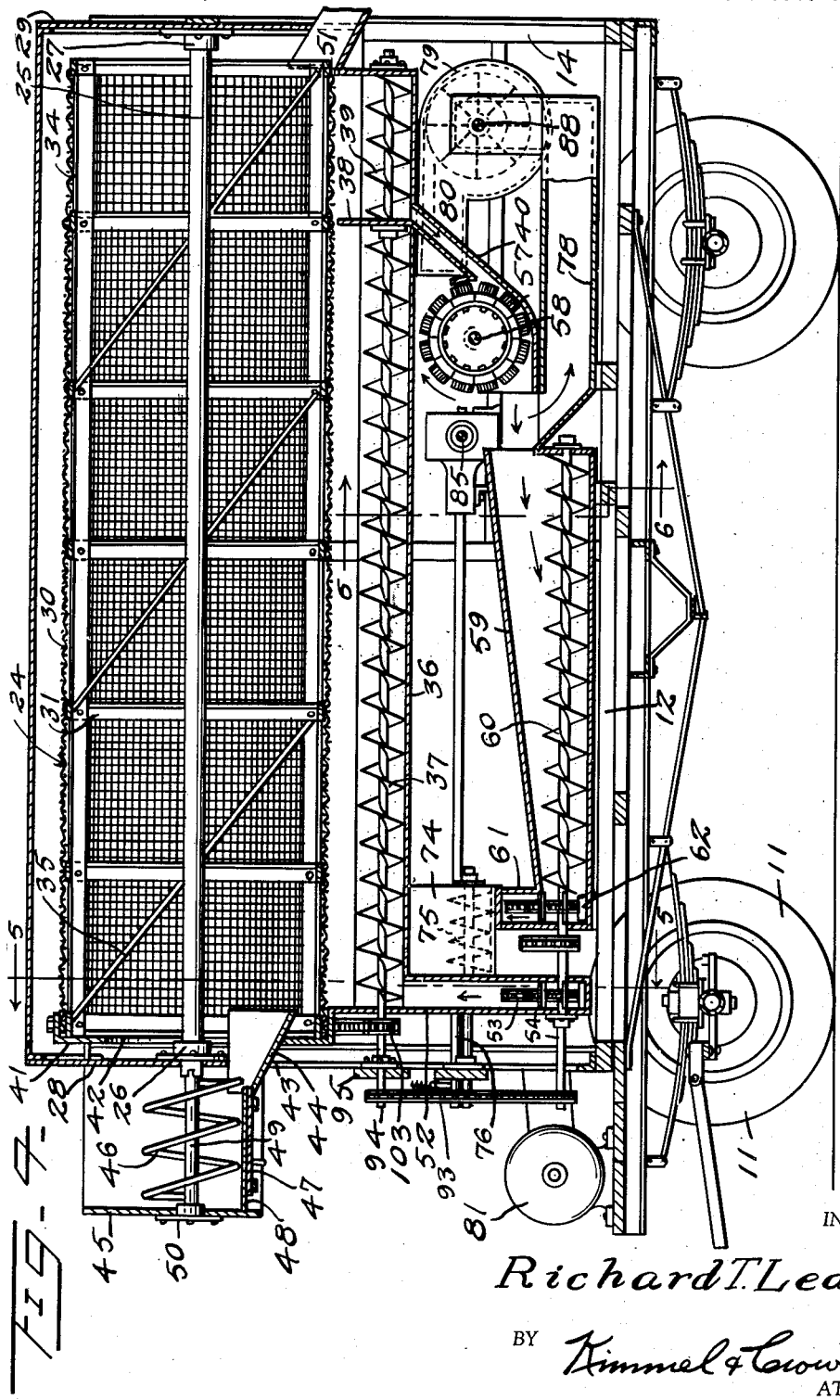

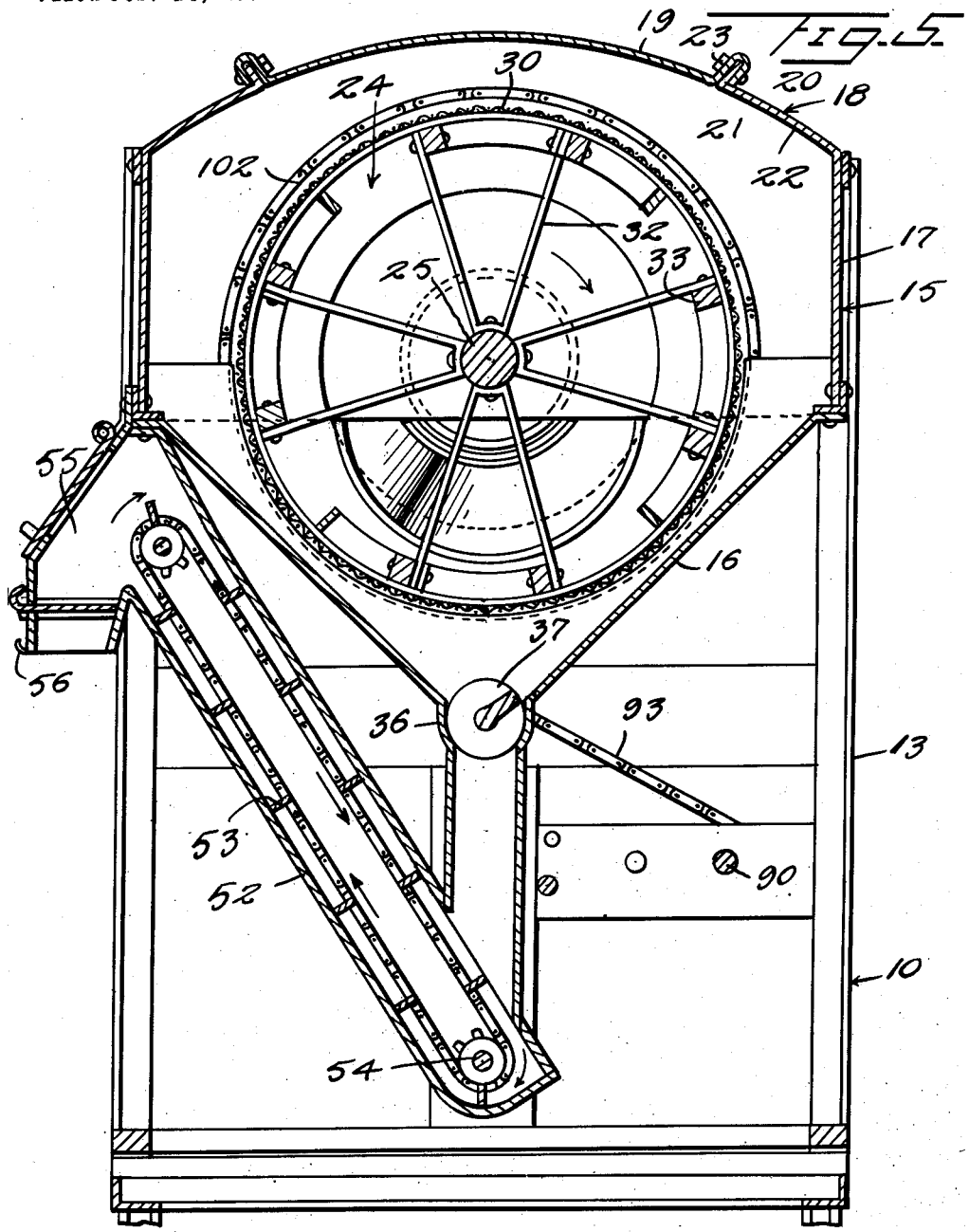

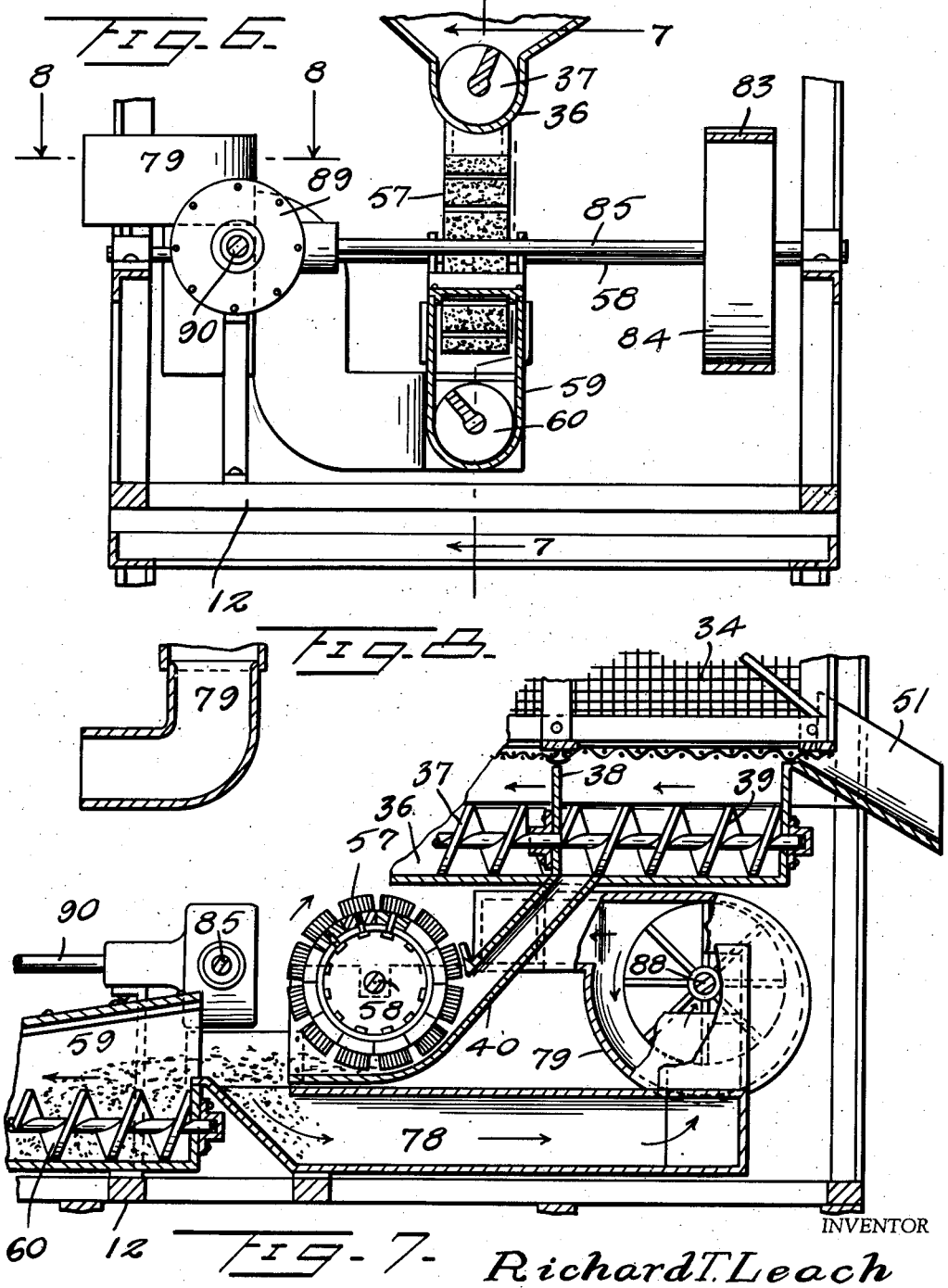

Patented Aug. 10, 1954

2,685,965

UNITED STATES PATENT OFFICE 2,685,965

SEED GRADING AND TREATING MACHINE

Richard T. Leach, Brownwood, Tex.

Application February 14, 1951, Serial No. 210,963

1 Claim. (Cl. 209—12)

This invention relates to a seed grading and treating machine.

An object of this invention is to provide a seed grading machine which is so constructed and arranged as to separate the small undesired seed from the larger and desired seed, in addition to removing dirt, lint, and other undesirable material.

Another object of this invention is to provide a machine of this kind which includes means for treating the larger seed with an insecticide or other chemical.

Another object of this invention is to provide a seed grading and treating machine wherein a large volume of seed may be graded and treated in a continuous operation.

A further object of this invention is to provide a machine of this kind which is mounted on a mobile frame structure and may be connected to any suitable power source.

The machine embodied in this invention is designed particularly for grading and treating cotton seeds and removing the lint from the seeds.

With the above and other objects in view, my invention consists in the arrangement, combination and details of construction disclosed in the drawings and specification, and then more particularly pointed out in the appended claim.

In the drawings:

Figure 1 is a detailed side elevation partly broken away and in section of a seed grading machine constructed according to an embodiment of this invention.

Figure 2 is a side elevation partly broken away of the machine on the side thereof opposite from that shown in Figure 1.

Figure 3 is a fragmentary sectional view taken on the line 3—3 of Figure 1.

Figure 4 is a vertical section taken longitudinally through the machine.

Figure 5 is a sectional view taken on the line 5—5 of either Figures 2 or 4.

Figure 6 is a fragmentary sectional view taken on the line 6—6 of Figure 4.

Figure 7 is a fragmentary sectional view taken on the line 7—7 of Figure 6.

Figure 8 is a fragmentary sectional view taken on the line 8—8 of Figure 6.

Referring to the drawings the numeral 10 designates generally a frame structure having wheels 11 rotatably mounted on the lower side thereof. The frame structure 10 includes a base frame 12 having uprights 13 at one end thereof and uprights 14 at the opposite end thereof. A housing generally designated as 15 is secured to the uprights 13 and 14 and comprises a V-shaped bottom wall 16, vertical side walls 17, and a transversely curved top wall 18. The top wall 18 is formed with a removable central portion 19 which has reverted or U-shaped longitudinal edges 20 engaging over outwardly projecting flanges 21 which are carried by the outer arcuate top portions 22.

The reverted or U-shaped edge portions 20 are secured to the flanges 21 by means of bolts 23.

A perforate or screen drum generally designated as 24 is rotatably mounted in the housing 15 and includes a shaft 25 journalled in bearings 26 and 27. The bearings 26 and 27 are carried by end walls 28 and 29, respectively, which are secured to the housing 15.

The drum 24 extends substantially the full length of the housing 15 and comprises a cylindrical screen 30 secured to circular bands 31 which are secured to the shaft 25 by means of spokes 32. The drum 24 is also formed of a plurality of circumferentially spaced apart and longitudinally extending bars 33. The screen 32 is a relatively fine screen for permitting small seeds, dirt and other small material to be screened from the drum, and a second coarser screen 34 is disposed concentrically of the screen 30 and projects from one end thereof.

The screen 34 is designed for permitting the larger or good seed to be removed from the drum or other material passing through the drum. The material is moved endwise through the drum by rotation of the drum by means of a plurality of spirally arranged material moving fins or blades 35. The housing 15 also includes a substantially U-shaped trough 36 disposed at the lower apex of the V-shaped bottom 16 and a conveyor 37 is rotatably mounted in the trough 36. A vertical wall or partition 38 extends from the lower portion of the drum 24 and projects into the trough 37 at the forward end of the conveyor 37. A second conveyor 39 is disposed in the forward end of the trough 36 being disposed in alignment with conveyor 37 and rotatable therewith.

The conveyor 39 is disposed below the forward screen or grading member 34 and is adapted to move the good or desired seed rearwardly into a downwardly and rearwardly inclined tubular guide 40 which projects downwardly from the trough 36. The drum 24 is provided with a rear end wall 41 having a central opening 42 through which the seed is adapted to be discharged for passage through the drum. The end wall 38 of the housing 15 is provided with an opening 43 through which a chute 44 extends and projects forwardly into the interior of the drum 24. The chute 44 is secured to a delivery hopper 45 which is fixed to and extends from the rear end of the housing 15.

A spiral screw 46 is rotatably mounted in the hopper 44 and constitutes a feeding means for feeding the material of the hopper into the chute 44 and into the drum 24. A transversely arcuate valve plate 47 is carried by the bottom 48 of the hopper 45 and provides a means whereby the movement of the seed from the hopper 45 to the drum 24 may be regulated. The conveyor 46 includes a conveyor shaft 49 which is journaled at one end in a bearing 50 carried by the hopper 45 and is fixed at its forward end relative to the rear end of the drum shaft 25.

The forward end of the drum 24 is open and a discharge chute 51 is carried by the forward end wall 29 and underlies a portion of the forward end of the drum 24 so that the trash or undesired material which does not pass through the forward screen 34 will be discharged from the forward end of the drum 24. The conveyor 37 is horizontally disposed and moves the small or undesired seed rearwardly into the lower end portion of an elevator housing 52. The housing 52 has an endless elevator 53 mounted therein which is operated from a shaft 54 journaled in the lower portion of the machine. The housing 52 extends upwardly and outwardly as shown in Figure 5 to one side of the machine and delivers the material received from the conveyor 37 into a hopper 55 having an open lower end and provided with hooks 56 whereby a bag or other receiver may be secured to the hopper 55 in order to collect or receive the undesired material.

A circular brush 57 is rotatably carried by the frame 10 being secured to a shaft 58 journaled in bearings 59. The brush 57 is disposed at the forward or lower end of the chute or guide 40 and rotates in a clockwise direction as viewed in Figure 4. The brush 57 is designed to quickly move the larger and desired seed rearwardly and in addition to separate any adhering lint or hulls which may be with the large seed.

The chute 40 is disposed in confronting position to a lower conveyor housing 59 which is of forwardly tapering construction with the larger end thereof foremost so that the seed which is brushed and thrown rearwardly by the rotary brush 57 will enter the conveyor housing 59 above a screw conveyor 60 which is rotatably mounted in the lower portion of the conveyor housing 59. The housing 59 communicates at its rear end with an upwardly and outwardly inclined elevator housing 61 within which an endless elevator 62 is mounted. The elevator housing 61 extends upwardly and outwardly and communicates at its upper end with a horizontally disposed combined conveyor and mixing housing 63. The housing 63 has a screw conveyor 64 rotatably mounted therein which is adapted to move the seeds and disinfecting material forwardly or to the right as viewed in Figure 1. The forward end of the conveyor housing 63 has connected therewith a pair of depending delivery members 65 and 66 which are provided with bag supporting hooks 67 and 68, respectively.

A slide valve 69 is associated with the delivery housing or member 65 so that if desired the seed may be cut off from the delivery housing 65 or the amount of seed discharged into the delivery housing 65 may be regulated as may be desired. The conveyor 63 is operated by means of a chain 70 engaging about a lower sprocket 71 which is fixed relative to the shaft 54. The conveyor 64 has fixed to the shaft 72 thereof an upper sprocket 73 about which the chain 70 also engages.

A hopper 74 is connected with and communicates with the elevator housing 61 and has a conveyor 75 rotatably mounted therein for feeding the material which in the present instance is a disinfectant or insecticide to the seed discharged into the elevator housing 61. The conveyor 75 is secured to a shaft 76 projecting rearwardly and having a sprocket 77 secured to the rear end thereof. A suction housing 78 is carried by the frame 10 and has the rear end thereof opening upwardly and communicating with the space between the rear side of the brush 57 and the forward end of the conveyor housing 59.

The lint and other light material which is flying in the space between the brush 57 and the housing 59 is drawn forwardly through the suction housing 78 and into a fan housing 79. The fan housing 79 has a delivery nozzle 80 projecting therefrom for discharging the light material into the atmosphere.

A power member 81 is fixed to the rear end of the frame 10 and includes a driving pulley 82 about which an endless belt 83 engages. The belt 83 extends forwardly and passes over a relatively large pulley 84 secured to a transversely disposed shaft 85. The belt 83 projects forwardly from the pulley 84 having the upper run thereof engaging beneath a pulley 86 which is secured to the brush shaft 58. The belt 82 also projects forwardly from the brush shaft 58 and engages about a pulley 87 carried by a fan shaft 88.

The shaft 85 extends into a gear housing or differential 89 and a rearwardly projecting drive shaft 90 extends from the gear housing 89 and has the rear end thereof journaled in a bearing 91 carried by the rear of the frame 10. A sprocket 92 is secured to the rear end of the drive shaft 90 and a chain 93 engages about the sprocket 92. The conveyor 37 includes a shaft 94 projecting through the rear of the frame structure being journaled in a bearing 95 and a sprocket 96 is fixed on the rear end of the shaft 94. The chain 93 engages about the sprocket 92 and extends upwardly from sprocket 92 to sprocket 96 and is then extended downwardly to a sprocket 97 which is mounted on the elevator shaft 54.

The chain 93 then extends upwardly over the sprocket 77, and an idler sprocket 98 engages the chain 93 between sprockets 92 and 77 being mounted on a rock lever 99 which is tensioned by means of a spring 100. The rear end of the drum 24 has a sprocket 101 fixed thereto and about which a chain 102 engages. The conveyor shaft 94 has a second sprocket 103 secured thereto and about which the chain 102 engages. A chain tensioning idler pulley 104 is rotatably carried by a rock lever 105 which has the opposite end of spring 100 fixed thereto so that the two levers 99 and 105 will be constantly urged to chain tensioning position.

In the use and operation of this machine the ungraded seed or other material is discharged into the receiving hopper 45, and the seed is discharged or delivered from the hopper 45 by means of the screw 46 to the rear end of the rotating drum 24. The small undesired seed with dirt or other fine material will be sifted from the larger seed, and the mass of seed within the drum 24 will be moved forwardly by means of fins 35. The larger and desired seed will pass through the forward grading screen 34 into the forward end of the trough or conveyor housing 36.

The undesired seed dropping into the trough 36 will be moved rearwardly to the elevator housing 52 and will be raised in the housing 52 by the endless elevator 53 and discharged into the hopper 55. The good seed dropping into the forward end of the trough 36 forwardly of the partition 38 will be moved rearwardly into the guide chute 40 and will gravitatingly drop inwardly in this chute and will be engaged by and spread out by means of the rotary brush 57. The large seed will be thrown rearwardly by the brush 57 into the large open end of the conveyor housing 59.

Any lint or light material which is mixed with the larger seed passing the brush 57 will be drawn downwardly and forwardly by the suction in a suction housing 78, the larger seed moving rearwardly by means of the conveyor 60 will be discharged into the elevator housing 61, and at the same time a disinfectant or insecticide will be discharged into elevator housing 61 for mixture with the large seed. This mixing operation occurs not only during the elevation of the seed by the elevator 62, but also by means of the conveyor 64. Any large particles in the initially discharged seed within the drum 24 which does not pass through the grading screen 34 will be discharged from the forward end of the drum 24 passing downwardly through the chute 51 and dropping onto the ground or other receiver.

What is claimed is:

A seed grading and treating machine comprising a mobile frame, a housing carried by said frame, said housing having a V-shaped bottom, a pair of screw conveyors rotatably disposed in the apex of said bottom, a cylindrical perforate drum rotatably disposed in said housing above said conveyors, a partition between the inner ends of said conveyors, means at the outer end of one of said conveyors for discharging small seeds at one side of said frame, a downwardly and inwardly inclined chute connected at one end with said bottom adjacent the inner end of said other conveyor, a horizontal conveyor housing adjacent to but spaced from the lower end of said chute and extending rearwardly therefrom, a screw conveyor in said conveyor housing, a rotary brush at the lower end of said chute engaging the bottom thereof to project the large seed at high speed toward said conveyor housing, means creating a suction in the space between the bottom of said chute and said conveyor housing for removing the light particles from the seed while the latter are moving between said brush and said conveyor housing, a hopper for disinfectant connected with said conveyor housing, a rotatable member in said hopper for passing said disinfectant into said conveyor housing to be mixed with the large seed and a conveyor for passing the large seed to one side of said frame.

References Cited in the file of this patent

UNITED STATES PATENTS

| Number | Name | Date |
|---|---|---|
| 144,329 | Fuller | Nov. 4, 1873 |
| 206,186 | Martin | July 23, 1878 |
| 424,100 | Dobson | Mar. 25, 1890 |
| 816,735 | Penther | Apr. 3, 1906 |
| 1,476,131 | Winters | Dec. 4, 1923 |
| 1,522,724 | Judson | Jan. 13, 1925 |
| 1,550,656 | Anderson | Aug. 25, 1925 |
| 2,117,805 | Hoefling | May 17, 1938 |
| 2,389,175 | Beardsley | Nov. 27, 1945 |

FOREIGN PATENTS

| Number | Country | Date |
|---|---|---|
| 2,795 | Great Britain | of 1891 |
| 27,034 | Great Britain | A. D. 1906 |
| 96,645 | Germany | Apr. 4, 1898 |